(12) United States Patent
Tsunashima et al.

(10) Patent No.: US 8,280,220 B2
(45) Date of Patent: Oct. 2, 2012

(54) REPRODUCTION APPARATUS, DATA PROCESSING SYSTEM, REPRODUCTION METHOD, PROGRAM, AND STORAGE MEDIUM

(75) Inventors: Shuji Tsunashima, Tokyo (JP); Shojiro Shibata, Kanagawa (JP); Mototsugu Takamura, Kanagawa (JP); Kyohei Koyabu, Kanagawa (JP); Shinjiro Kakita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1574 days.

(21) Appl. No.: 11/255,010

(22) Filed: Oct. 21, 2005

(65) Prior Publication Data
US 2006/0088285 A1    Apr. 27, 2006

(30) Foreign Application Priority Data
Oct. 26, 2004    (JP) ................ P2004-311599

(51) Int. Cl.
*H04N 5/765* (2006.01)
*H04N 5/931* (2006.01)

(52) U.S. Cl. ....................................... 386/200; 386/204

(58) Field of Classification Search ............... 386/46
See application file for complete search history.

(56) References Cited

U.S. PATENT DOCUMENTS

| | | | | |
|---|---|---|---|---|
| 5,592,226 A | * | 1/1997 | Lee et al. ................ | 375/240.14 |
| 5,892,883 A | * | 4/1999 | Bruls et al. .................... | 386/81 |
| 6,061,315 A | * | 5/2000 | Inagawa et al. ............ | 369/47.28 |
| 6,201,927 B1 | * | 3/2001 | Comer ............................ | 386/68 |
| 7,010,046 B2 | * | 3/2006 | Trevers et al. ........... | 375/240.29 |
| 2003/0169815 A1 | * | 9/2003 | Aggarwal et al. ........ | 375/240.12 |

FOREIGN PATENT DOCUMENTS

| | | |
|---|---|---|
| JP | 2000-217120 | 8/2000 |
| JP | 2004-23303 | 1/2004 |

OTHER PUBLICATIONS

U.S. Appl. No. 12/633,457, filed Dec. 8, 2009, Shibata, et al.

* cited by examiner

*Primary Examiner* — William C Vaughn, Jr.
*Assistant Examiner* — Oluwaseun A Adegeye
(74) *Attorney, Agent, or Firm* — Oblon, Spivak, McClelland, Maier & Neustadt, L.L.P.

(57) ABSTRACT

A reproduction apparatus successively decoding and reproducing a plurality of picture data forming reproduced data, comprising a reproduction memory, a decoder decoding the picture data, writing the decoding results in the reproduction memory, and reproducing and outputting the decoding results read from the reproduction memory, and a processing circuit for performing decoding scheduling for determining an order of making the decoder decode picture data belonging to a group of picture data in units of groups of picture data comprised of a predetermined plurality of the picture data, generating scheduling result data including decoding order data indicating the determined order and validity data indicating validity of the picture data, selecting the picture data to be processed in the order determined by the decoding scheduling based on the scheduling result data, and, conditional on the selected picture data being valid, making the decoder decode and reproduce and output the picture data and, when receiving a reproduction rate change command, updating the validity data of the scheduling result data in accordance with the changed reproduction rate.

18 Claims, 12 Drawing Sheets

| DECODING ORDER | PICTURE id | VALIDITY FLAG DATA VF |
|---|---|---|
| 0 | I2(02) | 1 |
| 1 | P5(05) | 1 |
| 2 | P8(08) | 1 |
| 3 | Pb(11) | 1 |
| 4 | Pe(14) | 1 |
| 5 | I2(17) | 1 |
| 6 | B3(03) | 1 |
| 7 | B4(04) | 1 |
| 8 | B6(06) | 1 |
| 9 | B7(07) | 1 |
| 10 | B9(09) | 1 |
| 11 | Ba(10) | 1 |
| 12 | Bc(12) | 1 |
| 13 | Bd(13) | 1 |
| 14 | B0(15) | 1 |
| 15 | B1(16) | 1 |

FWD(×1)

| DECODING ORDER | PICTURE id | VALIDITY FLAG DATA VF |
|---|---|---|
| 0 | I2(02) | 1 |
| 1 | P5(05) | 1 |
| 2 | P8(08) | 1 |
| 3 | Pb(11) | 1 |
| 4 | Pe(14) | 1 |
| 5 | I2(17) | 1 |
| 6 | B3(03) | 1 |
| 7 | B4(04) | 0 |
| 8 | B6(06) | 1 |
| 9 | B7(07) | 0 |
| 10 | B9(09) | 1 |
| 11 | Ba(10) | 0 |
| 12 | Bc(12) | 1 |
| 13 | Bd(13) | 0 |
| 14 | B0(15) | 1 |
| 15 | B1(16) | 0 |

FWD(×3)

FIG. 5

| DECODING ORDER | PICTURE id | VALIDITY FLAG DATA VF |
|---|---|---|
| 0 | I2(02) | 1 |
| 1 | P5(05) | 1 |
| 2 | P8(08) | 1 |
| 3 | Pb(11) | 1 |
| 4 | Pe(14) | 1 |
| 5 | I2(17) | 1 |
| 6 | B3(03) | 1 |
| 7 | B4(04) | 1 |
| 8 | B6(06) | 1 |
| 9 | B7(07) | 1 |
| 10 | B9(09) | 1 |
| 11 | Ba(10) | 1 |
| 12 | Bc(12) | 1 |
| 13 | Bd(13) | 1 |
| 14 | B0(15) | 1 |
| 15 | B1(16) | 1 |
|  |  |  |

FWD(×1)

FIG. 6

| DECODING ORDER | PICTURE id | VALIDITY FLAG DATA VF |
|---|---|---|
| 0 | I2(02) | 1 |
| 1 | P5(05) | 1 |
| 2 | P8(08) | 1 |
| 3 | Pb(11) | 1 |
| 4 | Pe(14) | 1 |
| 5 | I2(17) | 1 |
| 6 | B3(03) | 1 |
| 7 | B4(04) | 0 |
| 8 | B6(06) | 1 |
| 9 | B7(07) | 0 |
| 10 | B9(09) | 1 |
| 11 | Ba(10) | 0 |
| 12 | Bc(12) | 1 |
| 13 | Bd(13) | 0 |
| 14 | B0(15) | 1 |
| 15 | B1(16) | 0 |
|  |  |  |

FWD(×3)

FIG. 7

| DECODING ORDER | PICTURE id | VALIDITY FLAG DATA VF |
|---|---|---|
| 0 | I2(02) | 1 |
| 1 | P5(05) | 1 |
| 2 | P8(08) | 1 |
| 3 | Pb(11) | 1 |
| 4 | Pe(14) | 1 |
| 5 | I2(17) | 0 |
| 6 | B3(03) | 1 |
| 7 | B4(04) | 0 |
| 8 | B6(06) | 0 |
| 9 | B7(07) | 0 |
| 10 | B9(09) | 0 |
| 11 | Ba(10) | 0 |
| 12 | Bc(12) | 0 |
| 13 | Bd(13) | 1 |
| 14 | B0(15) | 0 |
| 15 | B1(16) | 0 |
|  |  |  |

FWD(×5)

REPRODUCTION APPARATUS, DATA PROCESSING SYSTEM, REPRODUCTION METHOD, PROGRAM, AND STORAGE MEDIUM

CROSS REFERENCES TO RELATED APPLICATIONS

The present invention contains subject matter related to Japanese Patent Application No. 2004-311599 filed in the Japan Patent Office on Oct. 26, 2004, the entire contents of which being incorporated herein by reference.

BACKGROUND OF THE INVENTION

1. Field of the Invention

The present invention relates to a reproduction apparatus, data processing system, reproduction method, program, and storage medium for reproducing reproduced data.

2. Description of the Related Art

For example, there is a reproduction apparatus which decodes and reproduces reproduced data encoded by the MPEG (Moving Picture Experts Group) scheme. Such a reproduction apparatus, for example, performs decoding scheduling for determining a timing and order of decoding picture data selected in accordance with a reference relationship of picture data and a reproduction rate in units of groups of I, P, and B picture data forming the reproduced data (GOP) and decodes the picture data and reproduces and outputs the decoding results in accordance with the results of the decoding scheduling. In this reproduction apparatus, for example, when receiving a command for change of the reproduction rate, in the decoding scheduling of the next GOP after the GOP being reproduced, results of decoding scheduling are generated corresponding to the changed reproduction rate. For reference, see Japanese Patent Publication (A) No. 2003-101967.

However, in the reproduction apparatus of the above related art, when receiving a command for changing the reproduction rate, since results of decoding scheduling corresponding to the changed reproduction rate are generated in the decoding scheduling of the next GOP after the GOP being reproduced, reproduction and output corresponding to the changed reproduction rate only are obtained in the next GOP after the GOP being decoded and reproduced and output when receiving the change command. Therefore, a long time is taken from when receiving the command for changing the reproduction rate to when reproduction and output corresponding to the changed reproduction rate are obtained, that is, there is the disadvantage that response is poor.

SUMMARY OF THE INVENTION

An object of the present invention is to provide a reproduction apparatus, data processing system, reproduction method, program, and storage medium able to shorten, compared with the related art, the time from when receiving a command for changing the reproduction rate to when obtaining reproduction and output corresponding to the changed reproduction rate when successively decoding and reproducing and outputting a plurality of picture data.

According to a first aspect of the invention, there is provided a reproduction apparatus successively decoding and reproducing a plurality of picture data forming reproduced data, comprising a reproduction memory, a decoder decoding the picture data, writing the decoding results in the reproduction memory, and reproducing and outputting the decoding results read from the reproduction memory, and a processing circuit for performing decoding scheduling for determining an order of making the decoder decode picture data belonging to a group of picture data in units of groups of picture data comprised of a predetermined plurality of the picture data, generating scheduling result data including decoding order data indicating the determined order and validity data indicating validity of the picture data, selecting the picture data to be processed in the order determined by the decoding scheduling based on the scheduling result data, and, conditional on the selected picture data being valid, making the decoder decode and reproduce and output the picture data and, when receiving a reproduction rate change command, updating the validity data of the scheduling result data in accordance with the changed reproduction rate.

The mode of operation of the reproduction apparatus of the first aspect of the invention is as follows: The processing circuit performs decoding scheduling for determining an order of making the decoder decode picture data belonging to a group of picture data in units of groups of picture data comprised of a predetermined plurality of the picture data and generates scheduling result data including decoding order data indicating the determined order and validity data indicating validity of the picture data. Further, the processing circuit selects the picture data to be processed in the order determined by the decoding scheduling based on the scheduling result data, and, conditional on the selected picture data being valid, makes the decoder decode and reproduce and output the picture data. Further, when receiving a reproduction rate change command, the processing circuit updates the validity data of the scheduling result data in accordance with the changed reproduction rate.

According to a second aspect of the invention, there is provided a data processing system comprising a data processing apparatus for outputting a plurality of picture data forming reproduced data to a reproduction apparatus and a reproduction apparatus for successively decoding and reproducing a plurality of picture data input from the data processing apparatus, the reproduction apparatus comprising an input memory for storing the picture data input from the data processing apparatus, a reproduction memory, a decoder decoding the picture data read from the input memory, writing the decoding results in the reproduction memory, and reproducing and outputting the decoding results read from the reproduction memory, and a processing circuit for performing decoding scheduling for determining an order of making the decoder decode picture data belonging to a group of picture data in units of groups of picture data comprised of a predetermined plurality of the picture data, generating scheduling result data including decoding order data indicating the determined order and validity data indicating validity of the picture data, selecting the picture data to be processed in the order determined by the decoding scheduling based on the scheduling result data, and, conditional on the selected picture data being valid, making the decoder decode and reproduce and output the picture data and, when receiving a reproduction rate change command, updating the validity data of the scheduling result data in accordance with the changed reproduction rate.

According to a third aspect of the invention, there is provided a data processing system comprising a data processing apparatus for outputting a plurality of picture data forming reproduced data to a reproduction apparatus and a reproduction apparatus for successively decoding and reproducing a plurality of picture data input from the data processing apparatus, the reproduction apparatus comprising an input memory for storing the picture data input from the data processing apparatus, a reproduction memory, a decoder decoding the picture data read from the input memory, writing the decoding results in the reproduction memory, and reproducing and outputting the decoding results read from the reproduction memory, and a processing circuit for performing decoding scheduling for determining an order of making the decoder decode picture data belonging to a group of picture data in units of groups of picture data comprised of a predetermined plurality of the picture data, generating scheduling result data including decoding order data indicating the determined order and validity data indicating validity of the picture data, selecting the picture data to be processed in the order determined by the decoding scheduling based on the scheduling result data, and, conditional on the selected picture data being valid, making the decoder decode and reproduce and output the picture data and, when receiving a reproduction rate change command, updating the validity data of the scheduling result data in accordance with the changed reproduction rate.

According to a fourth aspect of the invention, there is provided a reproduction method for successively decoding and reproducing a plurality of picture data forming reproduced data, comprising a first step of performing decoding scheduling for determining an order of making the decoder decode picture data belonging to a group of picture data in units of groups of picture data comprised of a predetermined plurality of the picture data and generating scheduling result data including decoding order data indicating the determined order and validity data indicating validity of the picture data, a second step of selecting the picture data to be processed in the order determined by the decoding scheduling based on the scheduling result data generated at the first step, and, conditional on the selected picture data being valid, making the decoder decode and reproduce and output the picture data, and a third step of, when receiving a reproduction rate change command, updating the validity data of the scheduling result data used at the second step in accordance with the changed reproduction rate.

According to a fifth aspect of the invention, there is provided a program executed by a reproduction apparatus successively decoding and reproducing a plurality of picture data forming reproduced data, comprising a first routine of performing decoding scheduling for determining an order of decoding picture data belonging to a group of picture data in units of groups of picture data comprised of a predetermined plurality of the picture data and generating scheduling result data including decoding order data indicating the determined order and validity data indicating validity of the picture data, a second routine of selecting the picture data to be processed in the order determined by the decoding scheduling based on the scheduling result data generated at the first routine and, conditional on the selected picture data being valid, decoding and reproducing and outputting the picture data, and a third routine of, when receiving a reproduction rate change command, updating the validity data of the scheduling result data used at the second routine in accordance with the changed reproduction rate.

According to a sixth aspect of the invention, there is provided a storage medium storing a program executed by a reproduction apparatus successively decoding and reproducing a plurality of picture data forming reproduced data, the program comprising a first routine of performing decoding scheduling for determining an order of decoding picture data belonging to a group of picture data in units of groups of picture data comprised of a predetermined plurality of the picture data and generating scheduling result data including decoding order data indicating the determined order and validity data indicating validity of the picture data, a second routine of selecting the picture data to be processed in the order determined by the decoding scheduling based on the scheduling result data generated at the first routine and, conditional on the selected picture data being valid, decoding and reproducing and outputting the picture data and, a third routine of, when receiving a reproduction rate change command, updating the validity data of the scheduling result data used at the second routine in accordance with the changed reproduction rate.

According to a seventh aspect of the invention, there is provided a data processing apparatus comprising a data processing means for outputting a plurality of picture data forming reproduced data to a reproducing means and a reproducing means for successively decoding and reproducing a plurality of picture data input from the data processing means, the reproducing means comprising an input memory for storing the picture data input from the data processing means, a reproduction memory, a decoder decoding the picture data read from the input memory, writing the decoding results in the reproduction memory, and reproducing and outputting the decoding results read from the reproduction memory, and a processing circuit for performing decoding scheduling for determining an order of making the decoder decode picture data belonging to a group of picture data in units of groups of picture data comprised of a predetermined plurality of the picture data, generating scheduling result data including decoding order data indicating the determined order and validity data indicating validity of the picture data, selecting the picture data to be processed in the order determined by the decoding scheduling based on the scheduling result data, and, conditional on the selected picture data being valid, making the decoder decode and reproduce and output the picture data and, when receiving a reproduction rate change command, updating the validity data of the scheduling result data in accordance with the changed reproduction rate.

According to the present invention, it is possible to provide a reproduction apparatus, data processing system, reproduction method, program, and storage medium able to shorten the time, compared with the related art, from when receiving a command for changing the reproduction rate to when reproduction and output corresponding to the changed reproduction rate are obtained in the case of successively decoding and reproducing a plurality of picture data.

BRIEF DESCRIPTION OF THE DRAWINGS

These and other objects and features of the present invention will become clearer from the following description of the preferred embodiments given with reference to the attached drawings, wherein:

FIG. 5 is a view for explaining a scheduling result data DSCD generated when the designated reproduction rate is 1× speed;

FIG. 6 is a view for explaining a scheduling result data DSCD generated when the designated reproduction rate is 3× speed;

FIG. 7 is a view for explaining a scheduling result data DSCD generated when the designated reproduction rate is 5× speed;

DESCRIPTION OF THE PREFERRED EMBODIMENTS

Below, data processing systems according to embodiments of the present invention will be explained.

First Embodiment

In this embodiment, the case where the reproduction apparatus is provided with a plurality of decoders is illustrated.

Figure 1:
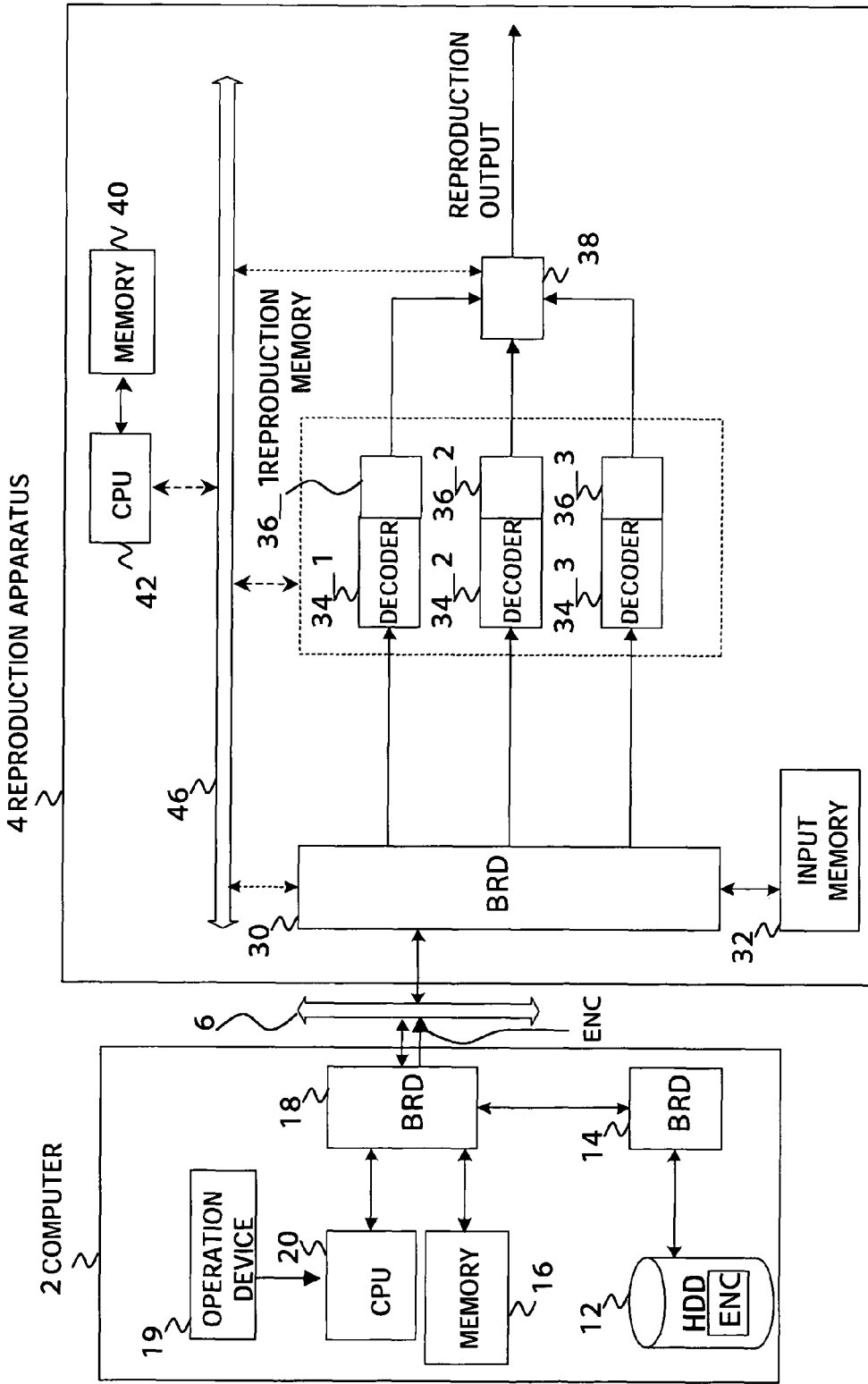
FIG. 1 is a view of the overall configuration of a data processing system according to a first embodiment of the present invention.

FIG. 1 is a view of the overall configuration of a data processing system 1 according to an embodiment of the present invention. As shown in FIG. 1, the data processing system 1, for example, has a computer 2 and a reproduction apparatus 4.

[Computer 2]

Figure 2:
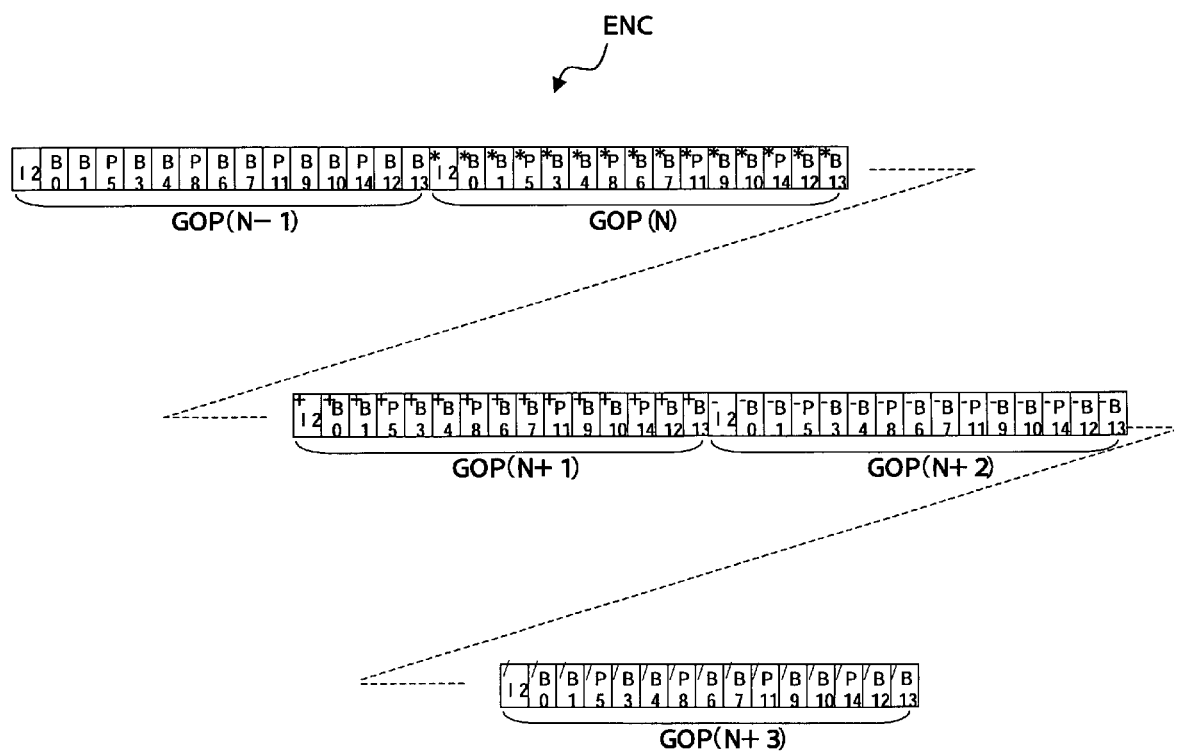
FIG. 2 is a view for explaining reproduced data ENC to be decoded by the data processing system shown in FIG. 1.

As shown in FIG. 1, the computer 2 has an HDD 12, a bridge 14, a memory 16, a bridge 18, operation device 19, and a CPU 20. The HDD 12 stores the reproduced data ENC encoded by the MPEG scheme. The reproduced data ENC is, as shown in FIG. 2, comprised of a plurality of GOPs (Group Of Pictures) successively decoded in order in the reproduction apparatus 4. In example shown in FIG. 2, the decoding is carried out in the order of GOP(N−1), (N), (N+1), (N+2). Each GOP is comprised of three types of picture data (frame data) of I, P, and B. Further, each GOP includes a single I picture data. In the present embodiment, for example, a so-called "long GOP" with a relatively large number of picture data in the GOP is used. Note that, in the drawings of this application, the picture data belonging to the GOP(N−1) is not given any symbol at the top left, the picture data belonging to the GOP(N) is given an asterisk at the top left, the picture data belonging to the GOP(N+1) is given a "+" at the top left, the picture data belonging to the GOP(N+2) is given a "−" at the top left, and the picture data belonging to the GOP(N+3) is given a "/" at the top left. Further, in the drawings, the numerals appended to the bottom or right of the "I", "P", and "B" show the order in which the decoding results of the picture data are reproduced and output.

The I picture data is picture data of an intra- (in-frame) encoded image and is decoded independently from other picture data. Further, the P picture data is picture data of the frame predictively encoded in the forward direction and is decoded with reference to the I or P picture data positioned time-wise in the past (previous display order). Note that the "I and P picture data" is also referred to as the "anchor picture data". Further, the B picture data is picture data of the frame predictively encoded in two directions and is decoded while referring to the I or P picture data positioned time-wise in front or in back (display order in front or back). Note that the read rate of the HDD 12 is slower than the maximum reproduction rate of the reproduction apparatus 4.

The bridge 14 provides an expansion function of the bridge 18 and is provided with a PCI expansion slot or IDE (Integrated Drive Electronics) slot etc. The bridge 14 basically has the same functions as the bridge 18, but has a narrower bandwidth than the bridge 18 and has lower speed access devices than the devices connected to the bridge 18 connected to it.

The memory 16 is for example a semiconductor memory and stores the programs and data used for the processing by the CPU 20. The operation device 19 is a keyboard, mouse, or other operating means and outputs an operation signal corresponding to user operations to the CPU 20. The operation device 19 receives an operation for designating a reproduction point of the reproduced data ENC, an operation for issuing a reproduction start command of the designated reproduction point, and a transient command operation in accordance with user operations based on a not shown operation screen and outputs an operation signal showing the same to the CPU 20. The bridge 18 has the bridge 14, memory 16, PCI bus 6, and CPU 20 connected to it and converts data along with transfer through the CPU 20 address bus and data bus.

The CPU 20, for example, executes a program read from the memory 16 to centrally control the operation of the computer 2. When the CPU 20 receives as input an operation signal from the operation device 19 indicating an operation for designating a reproduction point, it reads the GOP including the picture data of the designated reproduction point from the HDD 12 and outputs it through the bridge 18 and PCI bus 6 to the reproduction apparatus 4. Further, when the CPU 20 receives as input an operation signal indicating a reproduction start command operation from the operation device 19, it outputs a reproduction start command designating a reproduction point through the bridge 18 and PCI bus 6 to the reproduction apparatus 4. Further, when the CPU 20 receives as input an operation signal indicating a transient command operation from the operation device 19, it outputs the transient command through the bridge 18 and PCI bus 6 to the reproduction apparatus 4. Further, the CPU 20 outputs GOPs to the reproduction apparatus 4 so that a GOP one position in display order before the GOP including picture data of the reproduction point in the reproduction apparatus 4 in the GOPs in the reproduced data ENC and a GOP one position in display order after it are stored in the input memory 32 of the reproduction apparatus 4.

[Reproduction Apparatus 4]

As shown in FIG. 1, the reproduction apparatus 4, for example, has a PCI bridge 30, an input memory 32, decoders 34_1 to 34_3, reproduction memories 36_1 to 36_3, a selector 38, a control memory 40, a CPU 42, and a control bus 46. Note that the control memory 40 stores a predetermined program (program of the present invention) and the CPU 42 reads and executes that program to perform the following processing. The predetermined program may be stored in a semiconductor memory or other control memory 40 or may be stored on an HDD, optical disk, or other storage medium.

The PCI bridge 30 is provided with a memory for buffering the GOPs and commands input via the PCI bus 6 from the computer 2. Further, the bridge 18 is provided with a dynamic memory access (DMA) transfer function.

[Input Memory 32]

The input memory 32 is an SDRAM or other semiconductor memory and temporarily stores GOPs input via the PCI bridge 30.

[Decoders 34_1, 34-2, and 34-3]

The decoder 34_1, in accordance with the decode command input from the CPU 42 (control of the CPU 42), receives as input the reproduced data ENC read from the input memory 32 through the PCI bridge 30, decodes it by the MPEG scheme, and writes the results into the reproduction memory 36_1. Specifically, the decoder 34_1, under the control of the CPU 42, decodes the I picture data read from the input memory 32 without referring to the decoding results of other picture data. Further, the decoder 34_1, under the control of the CPU 42, decodes the P picture data read from the input memory 32 by referring to the decoding results of the I or P picture data positioned time-wise in the past and already having decoding results stored in the respective reproduction memory 36_1.

Figure 3:
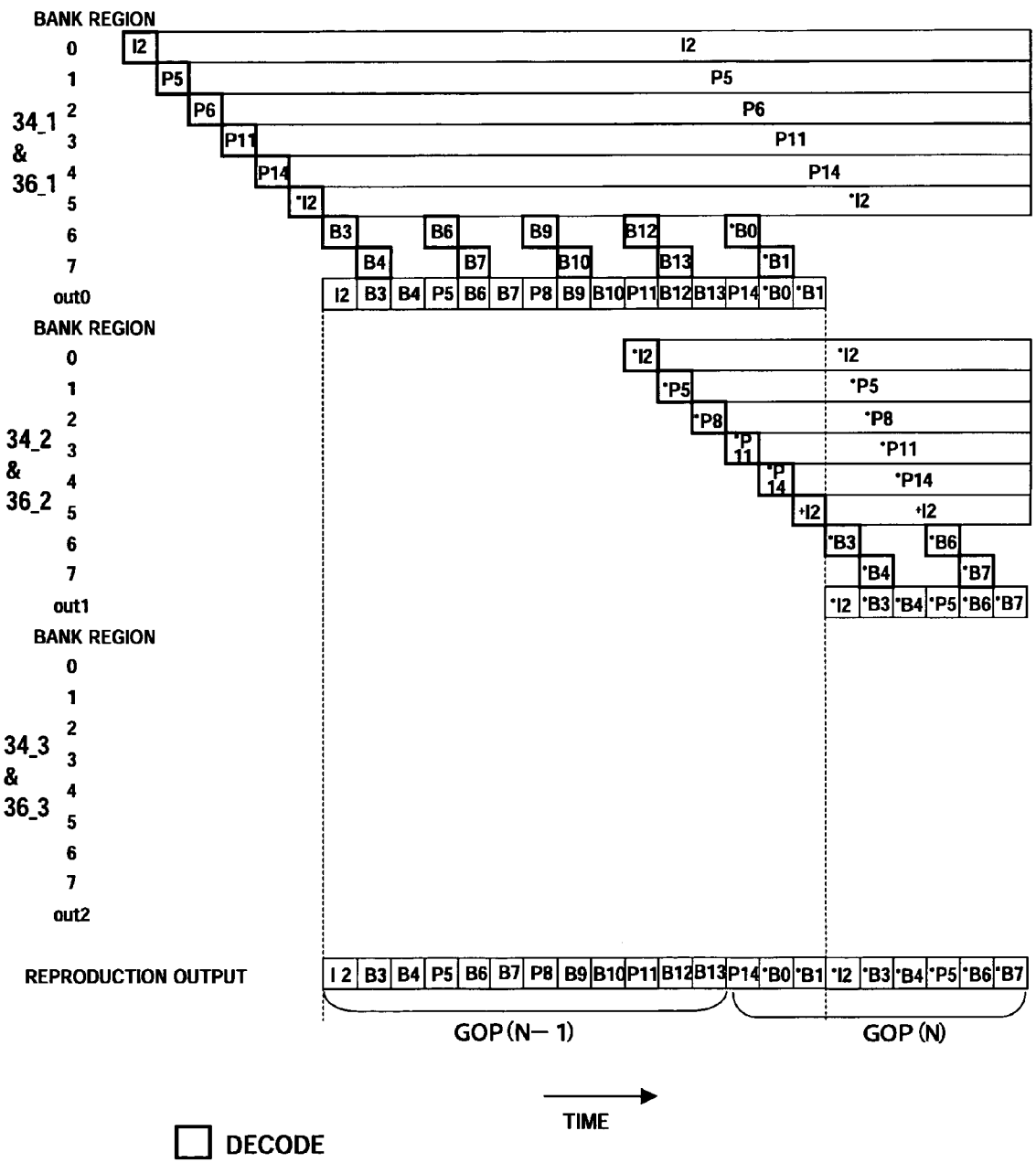
FIG. 3 is a view of decoding by decoders 34_1, 34_2, and 34_3, the storage states of reproduction memories 36_1 to 36_3, and reproduction and output in the case of reproducing reproduced data ENC shown in FIG. 2 in a forward direction.
Figure 4:
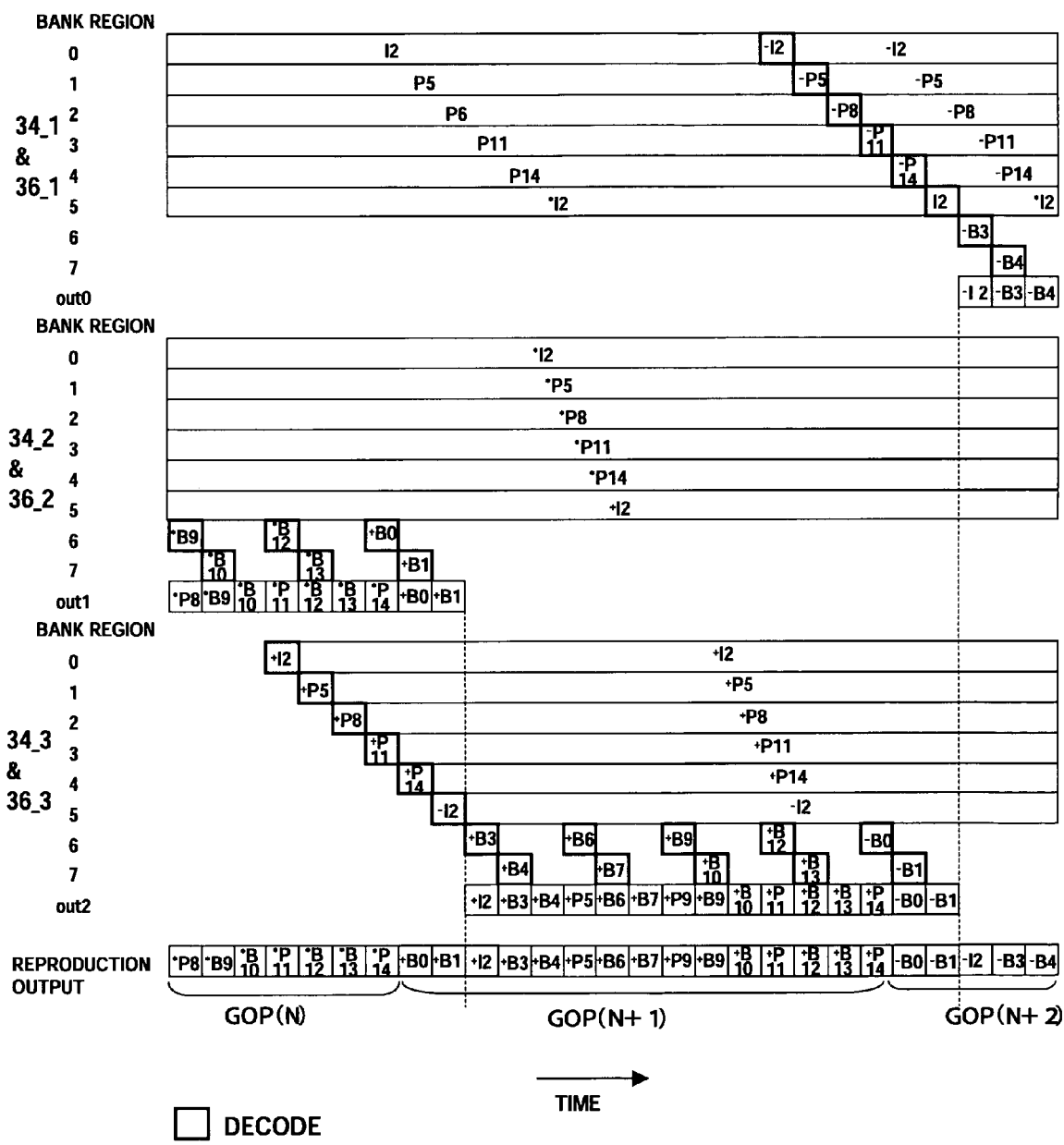
FIG. 4 is a view following FIG. 3 of decoding by decoders 34_1, 34_2, and 34_3, the storage states of reproduction memories 36_1 to 36_3, and reproduction and output in the case of reproducing reproduced data ENC shown in FIG. 2 in a forward direction.

FIG. 3 and FIG. 4 are views showing the decoding by the decoders 34_1, 34_2, and 34_3 when reproducing reproduced data ENC in the forward direction, the states of storage of the reproduction memories 36_1 to 36_3, and the production and output. In FIG. 3, FIG. 4, and the later explained corresponding drawings, the bank regions "0" to "7" shown linked with the decoder 34_1 are bank regions defined in the reproduction memory 36_1, the bank regions "0" to "7" shown linked with the decoder 34_2 are bank regions defined in the reproduction memory 36_2, and the bank regions "0" to "7" shown linked with the decoder 34_3 are bank regions defined in the reproduction memory 36_3. Further, "out0", "out1", and "out2" show decoding results output from the decoders 34_1, 34_2, and 34_3 to the selector 38. Further, the bottommost "reproduction and output" show reproduction and output from the selector 38. Further, in FIG. 3, FIG. 4, and the later explained corresponding drawings, parts shown surrounded by bold lines show the decoding by the decoders 34_1, 34_2, and 34_3.

As shown in FIG. 3 and FIG. 4, the decoder circuit 34_1 holds in the reproduction memory 36_1 the storage of the decoding results of the I and P picture data no longer used for reproduction and output in the case of continuing reproduction in the reproduction direction designated from the CPU 42 in accordance with a decode command from the CPU 42. For example, the decoder 34_1 holds the decoding results of I2, P5, P8, P11, P14, *I2 even after finishing the reproduction and output of the GOP(N−1). Due to this, as explained below, when a speed change command occurs, it can perform reproduction and output right after the speed change in the time for processing one picture by using the decoding results held in storage in the reproduction memory 36_1. That is, when a speed change command occurs, the decoder 34_1 can use the decoding results of the I and P picture data already stored in the reproduction memory 36_1 for the reproduction and output before that speed change command was issued. Specifically, for the I and P picture data, the decoder 34_1 reads and reproduces and outputs the decoding results of the I and P picture data already stored in the reproduction memory 36_1 after a speed change command in accordance with a display command from the CPU 42. Further, for the B picture data, the decoder 34_1 performs decoding referring to the decoding results of the I and P picture data forming anchor picture data of that B picture data already stored in the reproduction memory 36_1 after a speed change command in accordance with a decode command from the CPU 42 and reproduces and outputs the decoding results in accordance with a display command from the CPU 42.

Further, the decoder 34_1, as shown in FIG. 3, decodes the I and P picture data in the GOP being decoded before the B picture data in accordance with a decode command from the CPU 42 and writes the decoding results in the reproduction memory 36_1.

The decoders 34_2 and 34_3 have the same configurations as the decoder 34_1. They decode the image data input via the PCI bridge 30 by the MPEG scheme and write the results in their respective reproduction memories 36_2 and 36_3.

Below, the method of writing the decoding results in the reproduction memories 36_1, 36_2, and 36_3 by the decoders 34_1, 34_2, and 34_3 will be explained. As shown in FIG. 3 and FIG. 4, each of the reproduction memories 36_1, 36_2, and 36_3 has eight bank regions "0" to "7". In this embodiment, as shown in FIG. 3 and FIG. 4, among the eight bank regions provided at each of the reproduction memories 36_1, 36_2, and 36_3, the six bank regions "0" to "5" are used fixed as storage regions for exclusively storing the decoding results of the I and P picture data and the two bank regions "6" and "7" are used fixed as storage regions for storing the decoding results of the B picture data. That is, the reproduction memories 36_1 to 36_3 simultaneously store the decoding results of all of the I and P picture data decoded at the respective decoders 34_1, 34_2, and 34_3. This storage is held until the decoders are written with the decoding results of the I and P picture data of the GOP to be next decoded.

When decoding the reproduced data ENC shown in FIG. 2, the decoder 34_1, for example as shown in FIG. 3, writes the I2, P5, P8, P11, and P14 picture data in the GOP(N−1) and the I2 picture data in the GOP(N) in the bank regions "0" to "5" in the reproduction memory 36_1. Further, the decoder 34_2, for example as shown in FIG. 3 and FIG. 4, writes the I2, P5, P8, P11, and P14 picture data in the GOP(N) and the I2 picture data in the GOP(N+1) in the bank regions "0" to "5" in the reproduction memory 36_2. Further, the decoder 34_3, for example as shown in FIG. 3, writes the I2, P5, P8, P11, and P14 picture data in the GOP(N+1) and the I2 picture data in the GOP(N+2) in the bank regions "0" to "1" in the reproduction memory 36_3.

Further, the decoder 34_1, when decoding the B picture data in the GOP(N−1), refers to the decoding results of the I and P picture data stored in the bank regions "0" to "5" of the reproduction memory 36_1. Further, the decoder 34_2, when decoding the B picture data in the GOP(N), refers to the decoding results of the I and P picture data stored in the bank regions "0" to "5" of the reproduction memory 36_2. Further, the decoder 34_3, when decoding the B picture data in the GOP(N+1), refers to the decoding results of the I and P picture data stored in the bank regions "0" to "5" of the reproduction memory 36_3. Note that the decoders 34_1, 34_2, and 34_3 successively overwrite the decoding results of the B picture data which the banks "6" and "7" of the reproduction memories 36_1 to 36_3 store with the decoding results of the B picture data three pictures after that B picture data. Due to this, there is no need to provide banks regions corresponding to all of the B picture data in a GOP, and the reproduction memories 36_1 to 36_3 can be made small in size.

[Selector 38]

The selector 38, under the control of the CPU 42, switches and selectively reproduces and outputs the decoding results read from the reproduction memories 36_1, 36_2, and 36_3.

[CPU 42]

The CPU 42 performs the following processing based on the program and data stored in the control memory 40, and centrally controls the operation of the reproduction apparatus 4. The CPU 42 writes the GOP input from the computer 2 (reproduced data ENC) to the input memory 32. The CPU 42 performs the decoding scheduling for decoding the picture data included in the GOP corresponding to the designated reproduction rate in units of GOPs for GOPs stored in the input memory 32. Specifically, the CPU 42 performs the decoding scheduling for determining the order and timing for decoding the picture data in 1 GOP stored in the input memory 32 including the picture data of the reproduction point indicated by the reproduction start command based on the relationship of inter-reference between picture data, the reproduction rate, and the reproduction direction, and generates the scheduling result data DSRD shown in FIG. 5. That is, the CPU 42 generates the scheduling result data DSRD in units of GOPs. As shown in FIG. 5, the scheduling result data DSRD indicates the order for decoding all picture data in GOP using identification data (picture data id) of the picture data. FIG. 5 is a diagram for explaining a case where the designated reproduction rate is 1× speed. Note that, in FIG. 5, FIG. 6 and FIG. 7, numerals in parentheses attached to the picture id show the order of the reproduction and output. Further, as shown in FIG. 5, the scheduling result data DSRD includes the validity flag data VF indicating whether or not the picture data is reproduced in the designated reproduction rate for each picture data. In the present embodiment, for example, in the reproduction rate designated at the time of generation of the scheduling result data DSRD, the validity flag data VF indicating "1" is linked with the picture data to be reproduced and output, while the validity flag data VF indicating "0" is linked with the picture data not to be reproduced and output. When the reproduction rate is 1× speed shown in FIG. 5, the validity flag data VF linked with all picture data indicate "1". On the other hand, when the reproduction rate is 3× speed, the CPU 42 generates the scheduling result data DSRD having the validity flag data VF linked with I2, P5, P8, Pb, Pe, I2, B3, B6, B9, Bc, and B0 picture data indicating "1" and having the validity flag data VF linked with the other picture data indicating "0" as shown in FIG. 6. Further, when the reproduction rate is 5× speed, the CPU 42 generates the scheduling result data DSRD having the validity flag data VF linked with I2, P5, P8, Pb, Pe, B3, and Bd picture data indicating "1" and having the validity flag data VF linked with the other picture data indicating "0" as shown in FIG. 7.

The CPU 42 outputs the decode command and display command to the decoders 34_1, 34_2, and 34_3 so as to successively decode and reproduce and output the picture data set as valid in the designated order based on the scheduling result data DSRD of the GOP to be processed. When receiving the speed change command during the decoding and reproduction and output of the GOP to be processed based on the scheduling result data DSRD, the CPU 42 updates the validity flag data VF of the scheduling result data DSRD corresponding to the speed after change and after this performs the control of decoding and reproducing and outputting the unprocessed picture data in the GOP to be processed based on the validity flag data VF after updating. That is, the CPU 42 updates the scheduling result data DSRD only one time after the speed change command for the GOP in decoding and reproduction.

Note that, in the present embodiment, no matter what reproduction rate is designated, the CPU 42 decodes the I and P picture data prior to the B picture data.

Accordingly, after receiving a speed change command, no matter which of the I, P, and B picture data the changed speed reproduction and output are, the decoding results can be obtained in the decoding time of I picture data, and the changed change reproduction and output can be started in a short time.

The CPU 42 reads the picture data from the input memory 32 and outputs it to the decoders 34_1, 34_2, and 34_3 so that the I and P picture data belonging to the same GOP and the B picture data referring to decoding results of the I and P picture data are decoded in the same decoders 34_1, 34_2, and 34_3. The CPU 42, for example, reads the I and P picture data in the GOP(N−1) and the B picture data in the GOP(N) decoded by referring to the decoding results of the I and P picture data from the input memory 32 via the PCI bridge 30 and outputs it to the decoder 34_1. Here, in the present embodiment, the B picture data refers to the open GOP decoded by referring to the decoding results of the I and P picture data of different GOPs. Specifically, for example, the B0 and B1 picture data in the GOP(N) shown in FIG. 2 are decoded by referring to the decoding results of the I and P picture data in the GOP(N−1). Accordingly, the CPU 42 outputs the B0 and B1 picture data in the GOP(N) to the decoder 34_1.

Further, the CPU 42 for example reads the I and P picture data in the GOP(N) and the B picture data in the GOP(N+1) decoded by referring to the decoding results of the I and P picture data from the input memory 32 via the PCI bridge 30 and outputs it to the decoder 34_2. Further, the CPU 42 for example reads the I and P picture data in the GOP(N+1) and the B picture data in the GOP(N+2) decoded by referring to the decoding results of the I and P picture data from the input memory 32 via the PCI bridge 30 and outputs it to the decoder 34_3.

Below, an example of the operation of the data processing system 1 shown in FIG. 1 will be explained.

[First Example of Operation]

Figure 8:
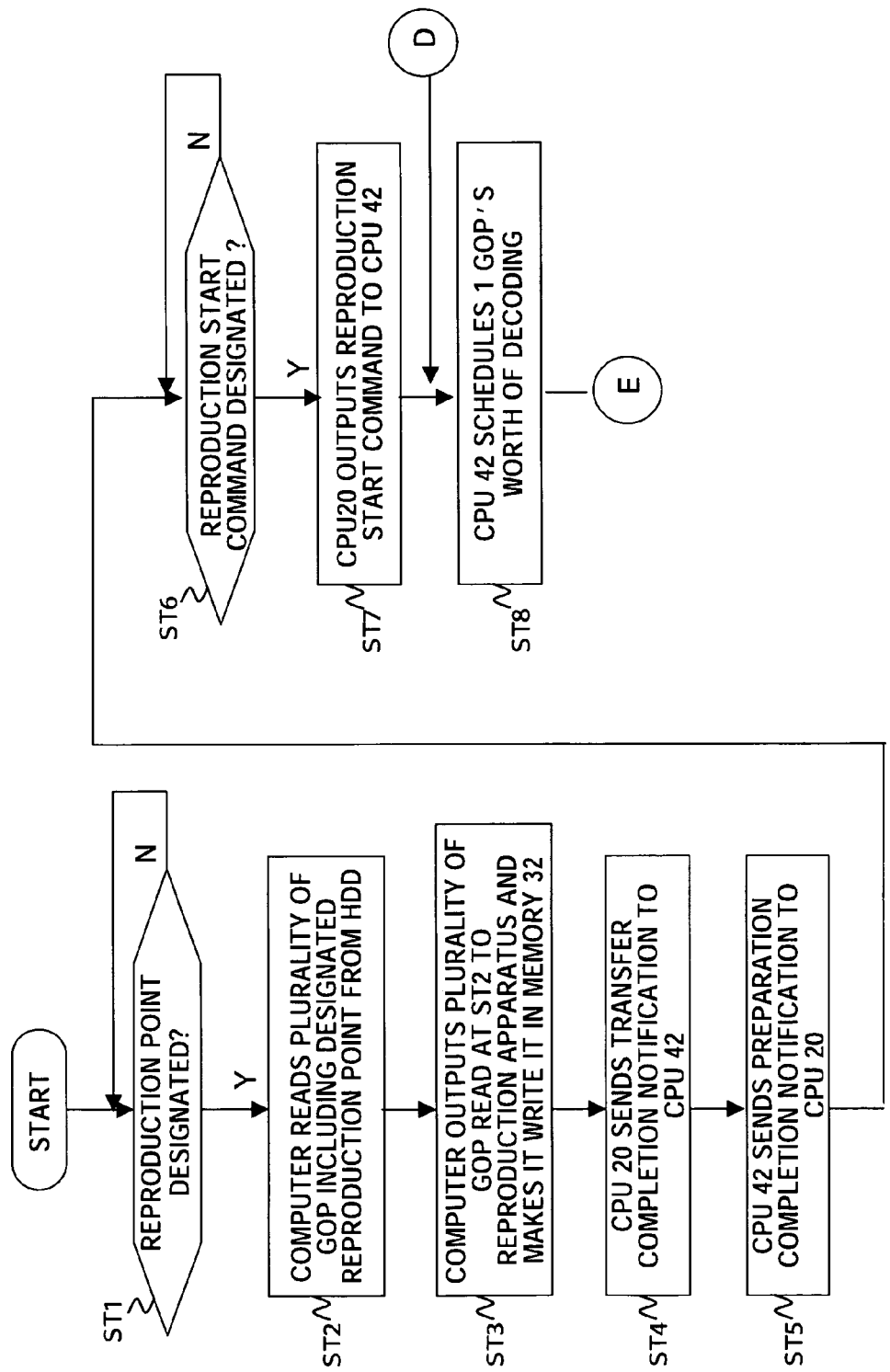
FIG. 8 is a flow chart for explaining an example of the overall operation of the data processing system shown in FIG. 1.
Figure 9:
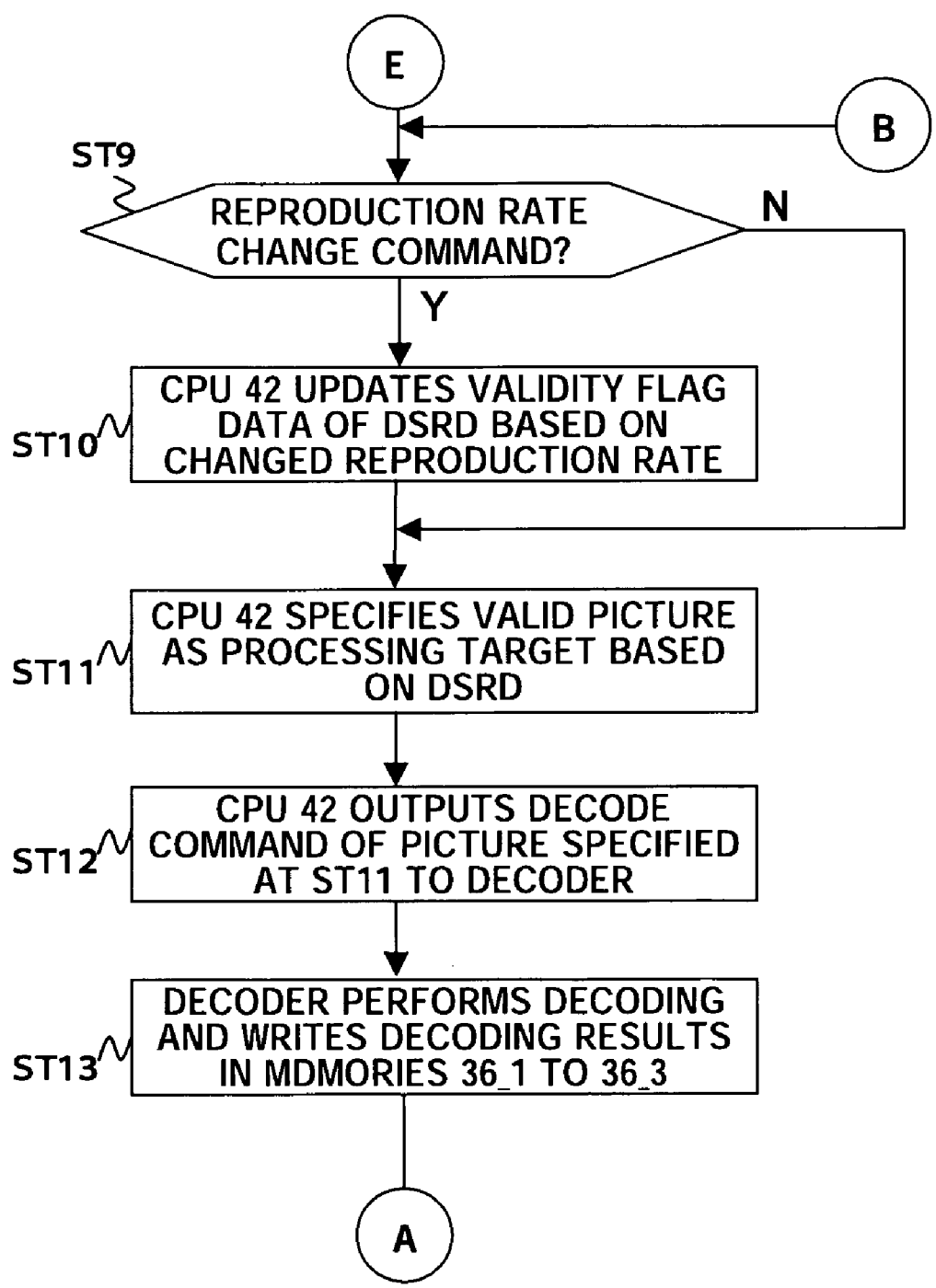
FIG. 9 is a flow chart following FIG. 8 for explaining an example of the overall operation of the data processing system shown in FIG. 1.
Figure 10:
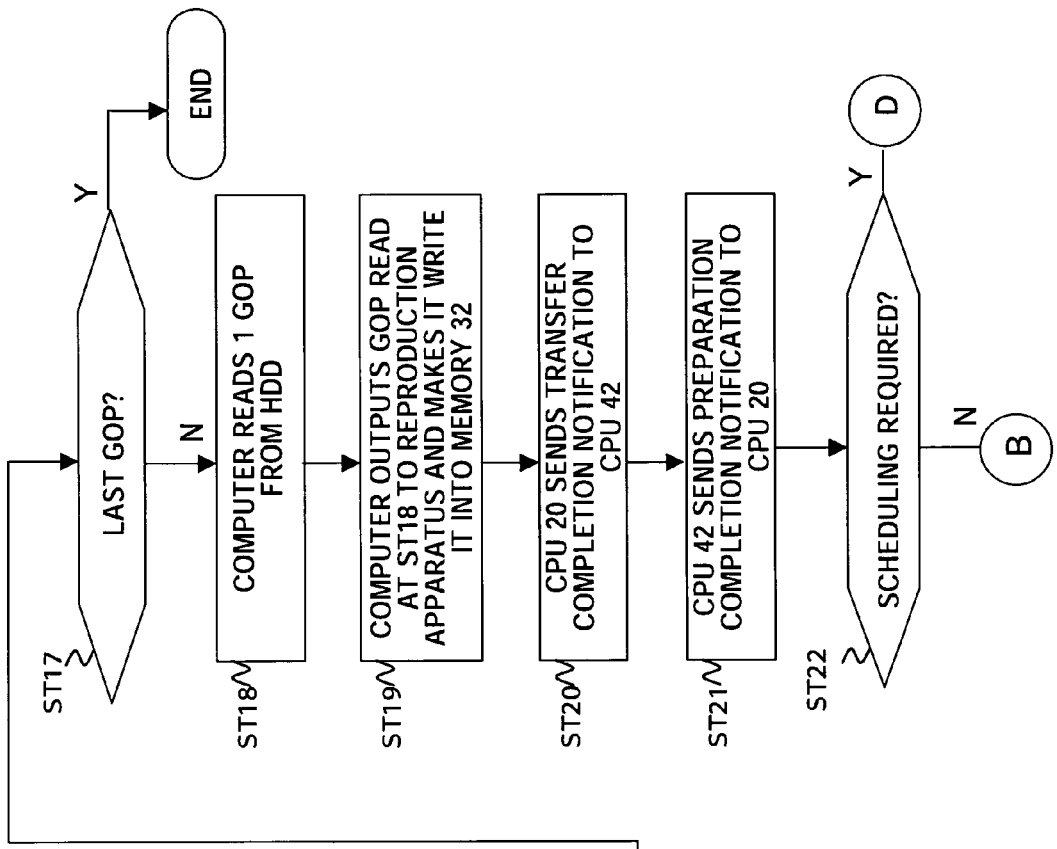
FIG. 10 is a flow chart following FIG. 9 for explaining an example of the overall operation of the data processing system shown in FIG. 1.
Figure 10:
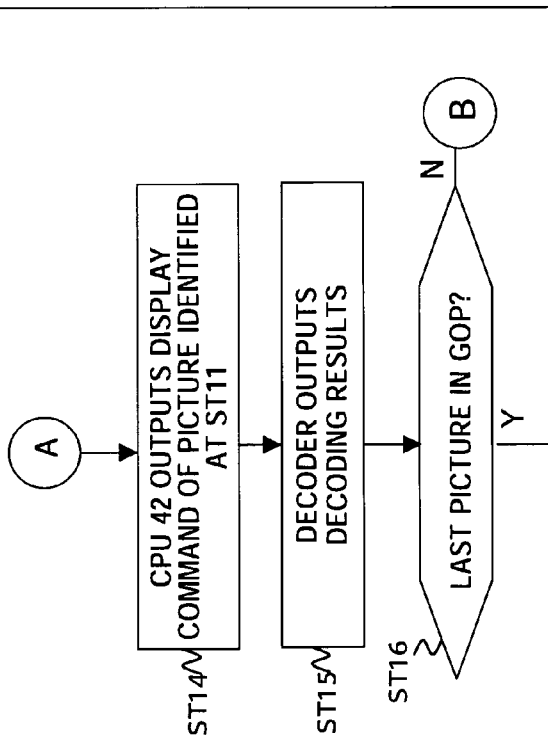

Below, an example of the operation from when designating the image data to be reproduced in the computer 2 to when the reproduction and output are carried out in the reproduction apparatus 4 will be explained. FIG. 8 to FIG. 10 are flow charts for explaining the example of the operation.

Step ST1:

The CPU 20 of the computer 2 judges if an operation signal indicating an operation for designation of a reproduction point in the reproduced data ENC has been input from the operation device 19. It proceeds to step ST2 when judging it has been designated, while repeats the processing of step ST1 when judging it has not.

Step ST2:

The CPU 20 of the computer 2 reads from the HDD 12 the GOP including the picture data of the reproduction point designated at step ST1 and the surrounding GOPs or a total of three (plurality of) GOPs.

Step ST3:

The CPU 20 of the computer 2 outputs the plurality of GOPs read at step ST2 through the bridge 18 and PCI bus 6 to the reproduction apparatus 4. The CPU 42 of the reproduction apparatus 4 writes the GOPs input from the computer 2 through the PCI bridge 30 into the input memory 32.

Step ST4:

The CPU 20 of the computer 2 outputs a transfer completion notification to the CPU 42 of the reproduction apparatus 4. This transfer completion notification shows the identification data of the GOPs output (transferred) at step ST3 from the computer 2 to the reproduction apparatus 4, the addresses in the input memory 32 where the GOPs are written, and the sizes of the data of the GOPs. Further, the transfer completion notification shows the identification data of each picture data in the output GOP, the address in the input memory 32 where the picture data has been written, and the size of the picture data. The CPU 42 writes that transfer completion notification in the memory 40.

Step ST5:

The CPU 42 of the reproduction apparatus 4, after finishing the processing of step ST4, outputs a preparation completion notification to the CPU 20 of the computer 2.

Step ST6:

The CPU 20 of the computer 2 judges if an operation signal indicating a reproduction start command operation designating a reproduction point has been input from the operation device 19. It proceeds to step ST7 when judging it has been input, while repeats the processing of step ST6 when judging it has not. The reproduction start command, for example, designates the reproduction rate.

Step ST7:

When judging input, the CPU 20 of the computer 2 outputs a reproduction start command designating a reproduction point to the CPU 42 of the reproduction apparatus 4.

Step ST8:

The CPU 42 of the reproduction apparatus 4 performs the decoding scheduling for determining the order and timing of decoding the picture data in a GOP stored in the input memory 32 including picture data of a reproduction point indicated by the reproduction start command input at step ST7 in accordance with the relationship of inter-reference between the picture data, the reproduction rate, and the reproduction direction so as to generate the scheduling result data DSRD.

Step ST9:

The CPU 42 of the reproduction apparatus 4 judges whether or not a speed change command is input from the CPU 20 of the computer 2, proceeds to step ST10 when judging it has been input, while proceeds to step ST11 if otherwise. The CPU 42 proceeds to step ST10 by the processing of the step ST9 executed right after the output of the speed change command and proceeds to step ST11 when it is executed next. That is, the CPU 42 updates the scheduling result data DSRD only one time after the speed change command.

Step ST10:

The CPU 42 of the reproduction apparatus 4 updates the validity flag data VF in the scheduling result data DSRD generated at step ST8 based on the changed reproduction rate designated by the speed change command. In this case, when the speed change command indicates acceleration, the CPU 42 changes part of the valid picture data indicated by the validity flag data VF to invalid, while when the speed change command indicates deceleration, it changes part of the invalid picture data indicated by the validity flag data VF to valid.

Step ST11:

The CPU 42 of the reproduction apparatus 4 identifies the valid picture data to be processed next in the GOP being processed as the processing target based on the validity flag data VF in the scheduling result data DSRD.

Step ST12:

The CPU 42 of the reproduction apparatus 4 outputs the decode command of the picture data identified at step ST11 to any of the decoders 34_1, 34_2, and 34_3. Note that the CPU 42 does not output the decode command when the decoding results of the picture data identified at step ST9 have been already stored in the reproduction memories 36_1, 36_2, and 36_3.

Step ST13:

The decoders 34_1, 34_2, and 34_3 of the reproduction apparatus 4 read the picture data indicated by the decode command input at step ST12 from the input memory 32 and decode and write the decoding results to the reproduction memories 36_1 to 36_3.

Step ST14:

The CPU 42 of the reproduction apparatus 4 identifies the picture data to be reproduced and output next based on the validity flag data VF in the scheduling result data DSRD and outputs the display command designating the picture data to the corresponding decoders 34_1, 34_2, and 34_3.

Step ST15:

The decoders 34_1, 34_2, 34_3 of the reproduction apparatus 4 read decoding results of the picture data designated by the display command based on the display command input at step ST14 from the reproduction memories 36_1, 36_2, and 36_3 and output them to the selector 38. Due to this, decoding results of the designated picture data are reproduced and output. The reproduction apparatus 4 performs the processing of steps ST9 to ST15 explained above in units of the picture data.

Step ST16:

The CPU 20 and CPU 42 judges whether or not the picture data after performing the processing of steps ST9 to ST15 explained above is the last picture data in the GOP, proceeds to step ST17 when judging as the last picture data, while if otherwise, returns to step ST9 and performs the processing for the next picture data.

Step ST17:

The CPU 20 and CPU 42 judge if the GOP to which the processed picture data belongs is the last GOP in the reproduced data ENC. If judging that it is the last GOP, they end the processing, while if otherwise, they proceed to step ST18.

Step ST18:

The CPU 20 of the computer 2 reads a next GOP from the HDD 12 in accordance with the reproduction direction.

Step ST19:

The CPU 20 of the computer 2 outputs the GOP read at step ST23 via the bridge 18 and PCI bus 6 to the reproduction apparatus 4. The CPU 42 of the reproduction apparatus 4 writes the GOP input from the computer 2 through the PCI bridge 30 into the input memory 32.

Step ST20:

The CPU 20 of the computer 2 outputs the transfer completion notification of the GOP output at step ST24 to the CPU 42 of the reproduction apparatus 4. The CPU 42 writes the transfer completion notification in the control memory 40.

Step ST21:

The CPU 42 of the reproduction apparatus 4 outputs a preparation completion notification to the CPU 20 of the computer 2 after the end of the processing at step ST25.

Step ST22:

The CPU 42 of the reproduction apparatus 4, for example, judges whether or not the scheduling of the GOP including the picture data of the reproduction point next in accordance with the reproduction direction has been finished (that is, whether or not the scheduling is required). When judging the scheduling is not finished, it proceeds to step ST8, while if otherwise, it proceeds to step ST9.

[Second Example of Operation]

In this example of operation, the decoding of step ST13 shown in FIG. 9 will be explained in detail. The CPU 42 of the reproduction apparatus 4, for example, reads the picture data included in the GOP stored in the input memory 32 as explained above by using FIG. 3 and FIG. 4 based on results of the scheduling and outputs it to the decoders 34_1, 34_2, and 34_3. Then, the decoders 34_1, 34_2, and 34_3 perform the decoding as explained above and write decoding results into the reproduction memories 36_1, 36_2, and 36_3.

The reproduction apparatus 4 decodes the I and P picture data of each GOP in the decoders 34_1, 34_2, and 34_3 preceding the B picture data as shown in FIG. 3 and FIG. 4 and writes the results into the fixed bank regions in the reproduction memories 36_1, 36_2, and 36_3. By this, if there is a time of decoding I picture's (1 frame's) worth of the data after that write operation, any picture data in the GOP being processed can be reproduced and output. That is, when a speed change command of the reproduction rate is generated during the decoding and the reproduction and output of the picture data in the GOP as will be explained below, by the processing of steps ST9 to ST18 shown in FIG. 6 and FIG. 7, after the speed change command, the picture data can be reproduced and output at the changed reproduction rate in the decoding time of one picture data. For example, when the B9 picture data in the GOP(N−1) shown in FIG. 3 is decoded and reproduced and output, the decoding results of the P8 and P11 picture data in the GOP(N−1) are required. Further, in order to decode the P8 picture data, the decoding results of the P5 picture data are required, while in order to decode the P5 picture data, the decoding results of the I2 picture data are required. Accordingly, in order to decode the P9 picture data, the decoding results of the I2, P5, P8, and P11 picture data are required. According to the reproduction apparatus 4, as shown in FIG. 3, by storing the I and P picture data in the reproduction memory 36_1, if the decoder 34_1 receives as input the B9 picture data of the GOP(N−1), the decoder 34_1 can quickly perform the processing for decoding and reproducing and outputting the B9 picture data by using the P8 and P11 picture data already stored in the bank regions "2" and "3" of the reproduction memory 36_1. Due to this, the reproduction rate can be changed without a time lag.

[Third Example of Operation]

Figure 11:
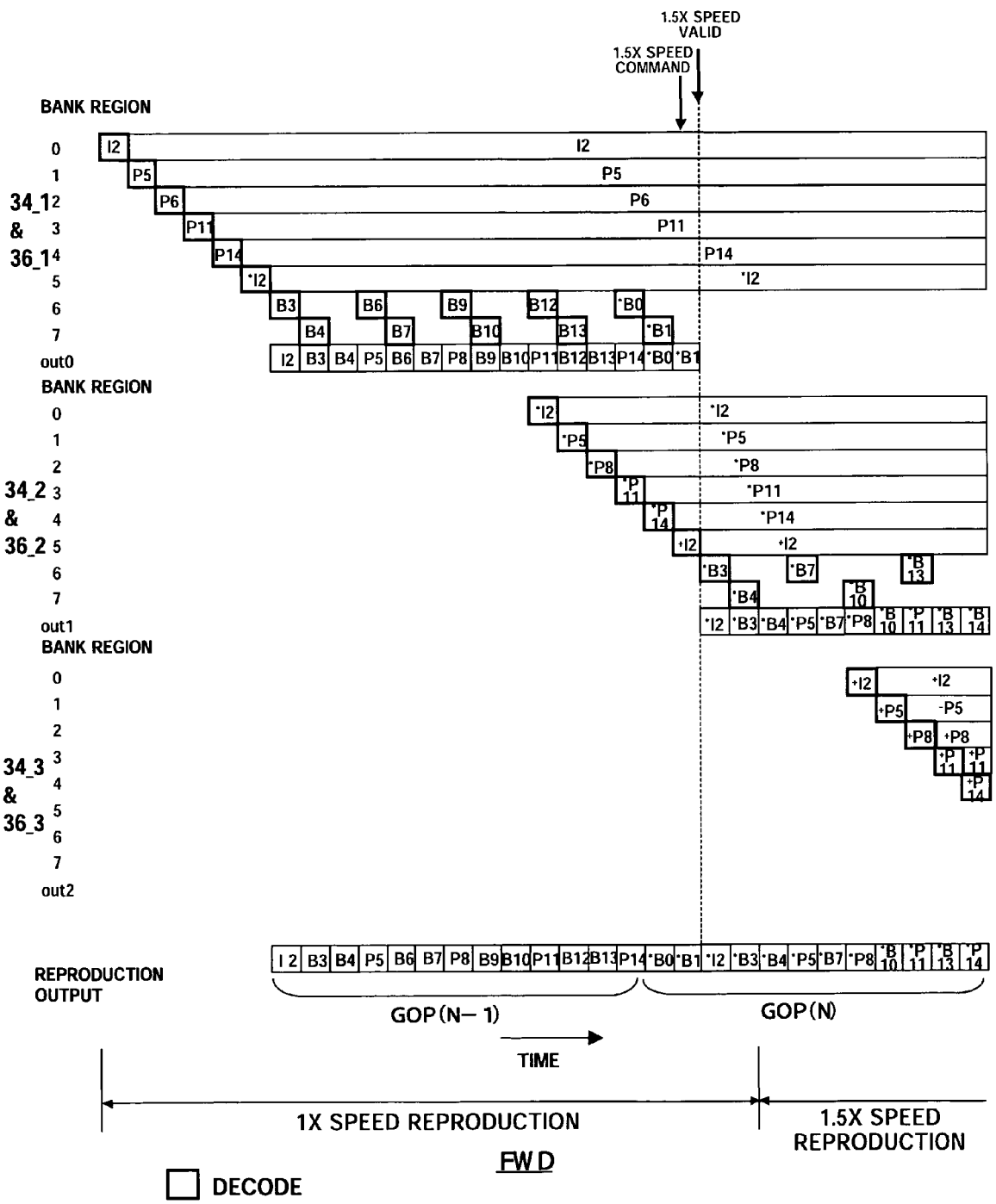
FIG. 11 is a view for explaining an example of operation of a reproduction apparatus in the case where the reproduction rate is changed in the order of 1.5× speed reproduction, 3× speed reproduction, and 1× speed reproduction when performing the forward (FWD) 1× speed reproduction shown in FIG. 3 and FIG. 4.
Figure 12:
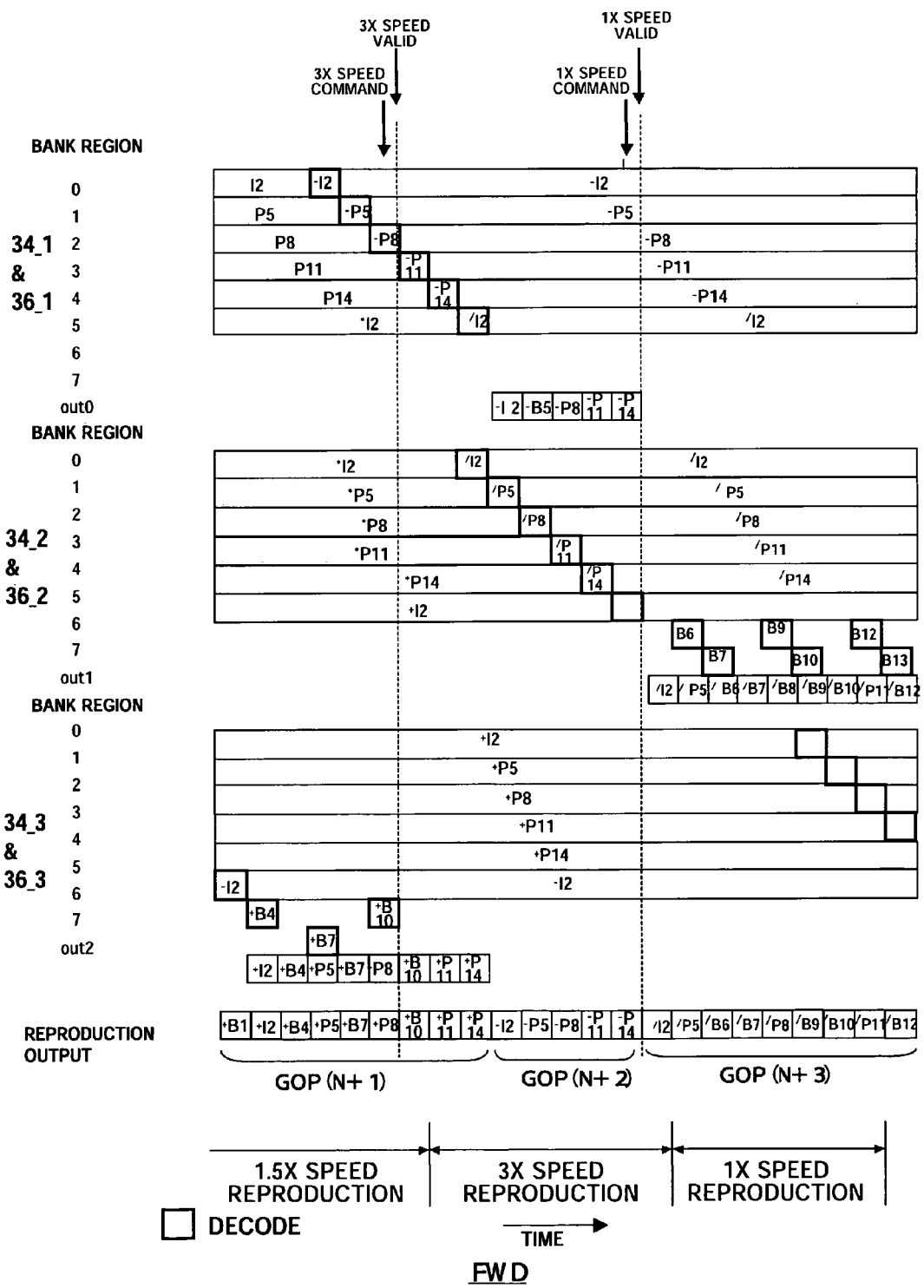
FIG. 12 is a view following FIG. 11 for explaining an example of operation of a reproduction apparatus in the case where the reproduction rate is changed in the order of 1.5× speed reproduction, 3× speed reproduction, and 1× speed reproduction when performing the forward (FWD) 1× speed reproduction shown in FIG. 3 and FIG. 4.

Below, an example of the operation of the reproduction apparatus 4 when changing the reproduction rate in the order of 1.5× speed reproduction, 3× speed reproduction, and 1× speed reproduction when performing forward (FWD) 1× speed reproduction shown in FIG. 3 and FIG. 4 will be explained. FIG. 11 and FIG. 12 are diagrams for explaining the example of operation. As shown in FIG. 11, the CPU 42 of the reproduction apparatus 4 makes the decoders 34_1 and 34_2 decode and reproduce and output the picture data of GOP(N−1) and (N) at 1× speed based on the scheduling result data DSRD shown in FIG. 5 of the 1× speed reproduction generated at step ST8 shown in FIG. 8. Then, when receiving the speed change command to 1.5× speed from the computer 2 during the reproduction and output of the decoding results of the B1 picture data of the GOP(N) at 1× speed, the CPU 42 executes the processing of step ST10 shown in FIG. 9 and updates the validity flag data VF of the scheduling result data DSRD corresponding to the 1.5× speed reproduction. Then, the CPU 42 shifts to the reproduction and output at 1.5× speed from the B4 picture data of the GOP(N) based on the scheduling result data DSRD after updating. In this way, in the reproduction apparatus 4, when receiving the speed change command, the scheduling result data DSRD is updated in accordance with the changed reproduction rate even during the processing of GOP, and remaining picture data in the GOP being processed are decoded and reproduced and output based on the scheduling result data DSRD after updating. Due to this, before the completion of the processing of GOP being processed, the reproduction and output of the changed reproduction rate are obtained.

Thereafter, when receiving the speed change command to 3× speed from the computer 2 during the reproduction and output of decoding results of the P8 picture data of the GOP (N+1) at 1× speed, the CPU 42 executes the processing of step ST10 shown in FIG. 9 and updates the validity flag data VF of the scheduling result data DSRD so as to correspond to the 3× speed reproduction as shown in FIG. 6. Then, the CPU 42 shifts to the reproduction and output at 3× speed from the P11 picture data of the GOP(N+1) based on the scheduling result data DSRD after updating.

Thereafter, when receiving the speed change command to 1× speed from the computer 2 during the reproduction and output of decoding results of the P14 picture data of the GOP(N+2) at 1× speed, the CPU 42 executes the processing of step ST10 shown in FIG. 9 and updates the validity flag data VF of the scheduling result data DSRD so as to correspond to the 1× speed reproduction as shown in FIG. 5. Then, the CPU 42 shifts to the reproduction and output at 1× speed from the P5 picture data of the GOP(N+3) based on the scheduling result data DSRD after updating. In this way, in the reproduction apparatus 4, as shown in FIG. 5 to FIG. 7, the decoding and the reproduction and output in accordance with the designated reproduction rate are carried out by updating only the validity flag data VF indicating validity or invalidity of each picture data. Due to this, even when the speed is changed to low speed, the decoding order indicated by the scheduling result data DSRD is utilized as it is, and only the validity flag data VF need be rewritten, therefore the changed scheduling result data DSRD can be generated in a short time.

As explained above, in the data processing system 1, as shown in FIG. 8 to FIG. 10, the reproduction apparatus 4 performs the decoding schedule in units of GOPs at step ST8 and generates the scheduling result data DSRD. When receiving a speed change command during the reproduction and output of the GOP, it updates the scheduling result data DSRD in accordance with the changed reproduction rate even during the processing of GOP and decodes and reproduces and outputs the remaining picture data in the GOP during the processing based on the scheduling result data DSRD after updating. Due to this, before the completion of the processing of the GOP being processed, the reproduction and output of the changed reproduction rate are obtained. As a result, the time from when the reproduction apparatus 4 receives a command for change of the reproduction rate to when the reproduction and output corresponding to the changed reproduction rate are obtained can be shortened in comparison with the related art. Such result is particularly large when a long GOP or HD (high definition) image is employed.

Further, in the data processing system 1, as shown in FIG. 5 to FIG. 7, the reproduction apparatus 4 performs the decoding and the reproduction and output in accordance with the designated reproduction rate by updating only the validity flag data VF indicating validity or invalidity of each picture data in the scheduling result data DSRD. Due to this, even when the speed is changed to low speed, the decoding order indicated by the scheduling result data DSRD is utilized as it is, and only the validity flag data VF need be rewritten, therefore the changed scheduling result data DSRD can be generated in a short time.

Further, in the data processing system 1, the reproduction apparatus 4 writes the decoding results of the I and P picture data in the fixed bank regions of the reproduction memories 36_1 to 36_3 preceding the B picture data and continuously holds this. Due to this, the reproduction apparatus 4 can reproduce and output all picture data in the GOP to be processed in the time for decoding the B picture data. Further, the reproduction apparatus 4 successively overwrites the decoding results of the B picture data in fixed banks in the reproduction memories 36_1, 36_2, and 36_3. Due to this, the reproduction and output corresponding to the changed reproduction rate can be carried out in a short time without much increasing the storage capacity of the reproduction memories 36_1 to 36_3.

The present invention is not limited to the above embodiments. That is, a person skilled in the art may make various changes to, form combinations or subcombinations of, or replace components of the embodiments within the technical scope of the present invention and the scope of their equivalents. In the above embodiments, further, as the plurality of picture data, MPEG picture data was illustrated, but the present invention may also be applied to audio data so long as it is decoded in order. Further, in the above embodiments, the MPEG was exemplified as the encoding scheme, but the present invention can be applied in the same way to also the case where the data is comprised of first type of picture data having decoding results referred to by the decoding of the other picture data and second type of picture data having decoding results not referred to by the decoding of the other picture data as components as in H.264/AVC (Advanced Video Coding).

In the above embodiments, the case where compressed picture data was stored in the HDD 12 was explained, but the present invention is not limited to this, for example, can also be applied to storage through an input/output interface etc. on an optical disk, magneto-optic disk, semiconductor memory, magnetic disk, or other various storage media. Further, the mode of connection is not limited to connection through cables etc. For example, connection by other types of connection modes such as connection by wires or wirelessly from the outside is also possible.

Further, in the above embodiments, the case of performing a series of processing by hardware having those functions was explained, but the present invention is not limited to this. Use of software for this is also possible. At this time, when performing a series of processing by software, various types of functions may be realized by installing various programs into the computer in which the program forming that software is built into to dedicated hardware. For example, it is installed in a general use personal computer etc. from for example a storage medium. Further, the storage medium for example includes an optical disk, magneto-optic disk, semiconductor memory, magnetic disk or other various storage media needless to say. Further, for example, it is also possible to install various types of programs in a general personal computer etc. for example by downloading them through the Internet or other networks.

Further, in the above embodiments, the steps describing the program stored in the storage medium may of course be performed in time sequence along the described order of course, but the invention is not limited in time sequence. Performance in parallel or individually is also included.

Further, in the above embodiments, the reproduction rate is not particularly limited. The invention may be broadly applied to specific processing of the reproduction apparatus at any variable speed reproduction operations.

Further, the block configurations of the embodiments are examples of the block configurations. The invention is not limited to the illustrated examples.

Further, by suitably providing a group of read flags indicating if the data read from the HDD 12 is valid for the compressed and encoded data stored in the HDD 12, a group of decode flags indicating validity at the time of scheduling of decoding, a group of display flags indicating validity at scheduling for display of the decoded data, etc. as metadata and automatically updating the series of flag groups in accordance with reproduction speed and direction, scheduling can be managed. At this time, the past series of scheduling used in variable speed reproduction processing and update information of the groups of flags may be managed as separate scheduling metadata (history information). This may in accordance with need be described as syntax in the compressed and encoded data or separately stored in a storage medium such as the HDD 12.

Further, the number of the decoders, the number of the banks, the decoder IDs, etc. may also be managed as metadata (component history information). Further, the reproduction speed, reproduction direction, etc. may also be managed as metadata (reproduction history information). At this time, the metadata may if necessary be described as syntax in the compressed and encoded data or separately stored in a storage medium such as the HDD 12. By referring to such metadata (history information), it is possible to reuse scheduling performed in the past and further to perform scheduling faster and more accurately. Note that this metadata may also be comprised so as to be managed at an outside apparatus as for example a database.

Note that, in the above embodiments, the present invention can also be applied to a case when the decoders 34-1 to 34-3 do not completely decode the compressed and encoded data stored on the HDD 12 (decode it up the middle). Specifically, for example, the present invention may also be applied to a case where the decoders 34_1 to 34_3 only perform decoding for variable length encoding and inverse quantization and do not perform inverse DCT, a case where they perform inverse quantization, but do not perform decoding for variable length encoding, etc. In such a case, for example, the decoders 34_1 to 34_3 may generate history information indicating for example up to what stage of encoding and decoding (for example, stage of inverse quantization) they performed processing for and output this linked with the incompletely decoded data.

Further, in the above embodiments, the HDD 12 stored incompletely encoded data (for example, data for which DCT and quantization were performed, but for which variable length encoding was not performed) and, in accordance with need, history information of the encoding and decoding, but the present invention may also be applied to the case where the decoders 34_1 to 34_3 can decode incompletely encoded data supplied under the control of the CPU 20 and convert it to a baseband signal. Specifically, the present invention can also be applied to the case where the decoders 34_1 to 34_3 for example perform inverse DCT and inverse quantization for data to which DCT and quantization have been applied, but variable length encoding has not been applied and do not perform decoding for variable length encoding. Further, in such a case, for example, the CPU 20 may obtain the history information of encoding and decoding stored in the HDD 12 linked with the incompletely encoded data and schedule the decoding by the decoders 34_1 to 34_3 based on that information.

Further, in the above embodiments, the HDD 12 stored the incompletely encoded data and, in accordance with need, history information of encoding and decoding, but the present invention may also be applied to the case where the decoders 34_1 to 34_3 do not completely decode the incompletely encoded data supplied under the control of the CPU 20 (decode it only to an intermediate stage). Further, in such a case as well, for example, the CPU 20 may obtain the history data of encoding and decoding stored in the HDD 12 linked with the incompletely encoded data and schedule the decoding by the decoders 34_1 to 34_3 based on this information. Further, in this case as well, the decoders 34_1 to 34_3 may generate history information of encoding and decoding in accordance with need and output it linked with the incompletely decoded data. In other words, the present invention may also be applied to the case where the decoders 34_1 to 34_3 perform partial decoding under the control of the CPU 20 (execute part of the steps of the decoding). The CPU 20 may obtain the history information of the encoding and decoding stored in the HDD 12 linked with the incompletely encoded data and schedule the decoding by the decoders 34_1 to 34_3 based on the information. The decoders 34_1 to 34_3 may also generate history information of encoding and decoding in accordance with need and output it linked with the incompletely encoded data.

Further, the HDD 12 may further store information on the history of encoding and decoding processing linked with the compressed and encoded stream data, and the CPU 20 may schedule the decoding of the compressed and encoded stream data based on the information on the history of the encoding processing and the decoding processing. Further, even when the decoder 34_1 to 34_3 can decode the compressed and encoded stream data and convert it to a baseband signal under the control of the CPU 20, it is possible to generate the information on the history of encoding and decoding in accordance with need and enable it to be output linked with the baseband signal.

Note that, in the above embodiments, the reproduction apparatus 4 was explained as having a plurality of decoders, but the present invention can also be applied to the case of a single decoder. At this time, the single decoder may not only receive, decode, and display or output the compressed and encoded data, but may also, in the same way as explained above, receive the compressed and encoded data, partially decode it up to an intermediate stage, and output it to the outside along with history information of encoding and decoding, receive partially encoded data, decode it, and convert it to a baseband signal for output to the outside, or receive partially encoded data, partially decode it to an intermediate stage, and output it to the outside along with history information of the encoding and decoding.

Further, in the above embodiments, the CPU 20 and CPU 42 were configured separately, but the invention is not limited to this. For example, the CPU 20 and CPU 42 may also conceivably be configured by a single CPU controlling the reproduction apparatus 4 as a whole. Further, even when the CPU 20 and CPU 42 are configured independently, the CPU 20 and CPU 42 may also be formed on a single chip.

Further, when the CPU 20 and CPU 42 are configured independently, it is possible to make at least part of the processing performed by the CPU 20 in the above embodiments be performed for example by time division by the CPU 42 or to make at least part of the processing performed by the CPU 42 be performed by for example time division by the CPU 20. That is, the CPU 20 and CPU 42 may also be realized using processors able to perform dispersed processing.

Further, for example, the reproduction apparatus 4 may be configured to be able to be connected to a network and, in the above embodiments, at least part of the processing performed by the CPU 20 or CPU 42 may be performed at the CPU of another apparatus connected through the network. Similarly, in the above embodiments, the memories 32, 40, etc. were configured separately, but the invention is not limited to this. These memories may conceivably also be configured by a single memory in the reproduction apparatus 4.

Further, in the above embodiments, the case of the HDD 12, the decoders 34_1 to 34_3, and the selector 38 being connected via bridges and buses and made integral as a reproduction apparatus was explained, but the present invention is not limited to this. For example, the invention may also be applied to the case where part of these components are connected by wires or wirelessly from the outside and the case where these components are connected to each other in other various modes of connection.

Further, in the above embodiments, the case of the compressed stream data being stored in an HDD was explained, but the present invention is not limited to this. For example, the invention may also be applied to the case of reproducing and processing stream data stored on an optical disk, magneto-optic disk, semiconductor memory, magnetic disk, or other various storage media.

Further, in the above embodiments, the CPU 42, memory 32, memory 40, decoders 34_1 to 34_3, and the selector 38 were mounted on the same expansion card (for example, PCI card or PCI-Express card), but the invention is not limited to this. For example, PCI-Express or other technology may be used to mount these components on separate expansion cards when the speed of transfer between cards is high.

The invention is not limited to the reproduction rates disclosed in embodiments. It may be applied to any variable speed reproduction.

Further, in this specification, a "system" means a logical collection of a plurality of apparatuses. It does not matter if the apparatuses of the different configurations are in the same housing or not.

The present invention may be applied to a system for reproducing reproduced data.

It should be understood by those skilled in the art that various modifications, combinations, sub-combinations, and alterations may occur depending on design requirements and other factors insofar as they are within the scope of the appended claims or the equivalents thereof.

We claim:

1. A reproduction apparatus successively decoding and reproducing a plurality of picture data forming reproduced data, comprising:
  a reproduction memory,
  a decoder configured to decode said picture data, write decoding results in said reproduction memory, and reproduce and output said decoding results read from said reproduction memory, and
  a processing circuit configured to perform decoding scheduling for determining an order of making said decoder decode picture data belonging to a group of picture data in units of groups of picture data comprised of a predetermined plurality of said picture data, generate scheduling result data including decoding order data indicating said determined order and validity data indicating which of the plurality of said picture data is reproduced at a first reproduction rate, select said picture data to be processed in said order determined by said decoding scheduling based on said scheduling result data, and, conditional on said selected picture data being valid, make said decoder decode and reproduce and output said picture data and, in response to receiving a reproduction rate change command that changes the first reproduction rate to a second reproduction rate, change said validity data of said scheduling result data in accordance with the second reproduction rate,
  wherein when receiving said change command while decoding, reproducing and outputting a first group of picture data at the first reproduction rate, said processing circuit is configured to decode, reproduce, and output not yet processed picture data of said first group of picture data based on said changed validity data and the second reproduction rate.

2. A reproduction apparatus as set forth in claim 1, wherein said processing circuit is configured to generate data indicating that picture data not reproduced at said second reproduction rate is invalid.

3. A reproduction apparatus as set forth in claim 1, wherein when receiving said change command while decoding, reproducing and outputting a first group of picture data, said processing circuit is configured to
newly generate said scheduling result data corresponding to said second reproduction rate in decoding scheduling of a second group of picture data processed after the first group of picture data.

4. A reproduction apparatus as set forth in claim 1, wherein said processing circuit is configured to control the decoding, reproduction, and output of said picture data and updates said scheduling result data based on said determination in units of single picture data.

5. A reproduction apparatus as set forth in claim 1, wherein said decoder is configured to
decode reproduced data, comprised of a first type of picture data where the results of decoding are referred to in decoding of other picture data and a second type of picture data where the decoding results are not referred to in decoding of other picture data, in units of said picture data,
hold the storage of said decoding results of said first type of said picture data in said reproduction memory, and
decode, reproduce, and output said second type of picture data by referring to decoding results of said first type of picture data already stored in said reproduction memory.

6. A reproduction apparatus as set forth in claim 5, wherein said decoder is configured to decode said first type of picture data in said plurality of picture data forming said reproduced data before said second type of picture data is decoded by referring to the decoding results of said first type of picture data.

7. A reproduction apparatus as set forth in claim 6, wherein said reproduction apparatus has as said first type of picture data I picture data decoded without referring to the decoding results of other picture data and P picture data decoded by referring to the decoding results of other picture data,
said second type of picture data is B picture data decoded by referring to the decoding results of other picture data, and
said decoder is configured to simultaneously store in a first storage region of said reproduction memory decoding results of said P picture data and decoding results of said first I picture data positioned between first I picture data with decoding results stored in said memory and second I picture data positioned next in said reproduction direction with respect to said first I picture data in the plurality of said I picture data.

8. A reproduction apparatus as set forth in claim 7, wherein said reproduction memory has a second storage region, separate from said first storage region, configured to store said B picture data, and
said decoder is configured to write decoding results of said reproduced and output B picture data over decoding results of other B picture data in order until finishing decoding all B picture data positioned between said first I picture data and said second I picture data.

9. A data processing system comprising:
a data processing apparatus configured to output a plurality of picture data forming reproduced data; and
a reproduction apparatus configured to receive the plurality of picture data from the reproduced data and successively decode and reproduce the plurality of picture data received from said data processing apparatus,
said reproduction apparatus including,
an input memory configured to store said picture data received from said data processing apparatus,
a reproduction memory,
a decoder configured to decode said picture data read from said input memory, write decoding results in said reproduction memory, and reproduce and output said decoding results read from said reproduction memory, and
a processing circuit configured to perform decoding scheduling for determining an order of making said decoder decode picture data belonging to a group of picture data in units of groups of picture data comprised of a predetermined plurality of said picture data, generate scheduling result data including decoding order data indicating said determined order and validity data indicating which of the plurality of said picture data is reproduced at a first reproduction rate, select said picture data to be processed in said order determined by said decoding scheduling based on said scheduling result data, and, conditional on said selected picture data being valid, make said decoder decode, reproduce, and output said picture data and, in response to receiving a reproduction rate change command that changes the first reproduction rate to a second reproduction rate, change said validity data of said scheduling result data in accordance with the second reproduction rate,
wherein when receiving said change command while decoding, reproducing and outputting a first group of picture data at the first reproduction rate, said processing circuit is configured to decode, reproduce, and output not yet processed picture data of said first group of picture data based on said changed validity data and the second reproduction rate.

10. A reproduction method for successively decoding and reproducing a plurality of picture data forming reproduced data, comprising:
performing, at a reproduction apparatus, decoding scheduling for determining an order of making a decoder of said reproduction apparatus decode picture data belonging to a group of picture data in units of groups of picture data comprised of a predetermined plurality of said picture data and generating scheduling result data including decoding order data indicating said determined order and validity data indicating which of the plurality of said picture data is reproduced at a first reproduction rate;
selecting, at the reproduction apparatus, said picture data to be processed in said order determined by said decoding scheduling based on said scheduling result data generated by said performing, and, conditional on said selected picture data being valid, making said decoder decode, reproduce, and output said picture data; and
in response to receiving a reproduction rate change command that changes the first reproduction rate to a second reproduction rate, changing, at the reproduction apparatus, said validity data of said scheduling result data used at said selecting in accordance with the second reproduction rate, wherein when receiving said change command while decoding, reproducing and outputting a first group of picture data at the first reproduction rate, decoding, reproducing, and outputting not yet processed picture data of said first group of picture data based on said changed validity data and the second reproduction rate.

11. A non-transitory computer readable storage medium encoded with instructions which when executed by a reproduction apparatus, causes said reproduction apparatus to implement a method comprising:

performing, at the reproduction apparatus, decoding scheduling for determining an order of decoding picture data belonging to a group of picture data in units of groups of picture data comprised of a predetermined plurality of said picture data and generating scheduling result data including decoding order data indicating said determined order and validity data indicating which of the plurality of said picture data is reproduced at a first reproduction rate;

selecting, at the reproduction apparatus, said picture data to be processed in said order determined by said decoding scheduling based on said scheduling result data generated at said performing and, conditional on said selected picture data being valid, decoding, reproducing, and outputting said picture data; and in response to receiving a reproduction rate change command that changes the first reproduction rate to a second reproduction rate, changing, at the reproduction apparatus, said validity data of said scheduling result data used at said selecting in accordance with the second reproduction rate, wherein when receiving said change command while decoding, reproducing and outputting a first group of picture data, decoding, reproducing, and outputting not yet processed picture data of said first group of picture data based on said changed validity data and the second reproduction rate.

12. A data processing apparatus comprising:

means for outputting a plurality of picture data forming reproduced data; and reproducing means for receiving the plurality of picture data from the reproduced data and successively decoding and reproducing a plurality of picture data received from said means for outputting, said reproducing means including, means for storing said picture data received from said means for outputting, means for decoding said picture data read from said input memory, writing decoding results in a reproduction memory, and reproducing and outputting said decoding results read from said reproduction memory, and means for performing decoding scheduling for determining an order of making said means for decoding decode picture data belonging to a group of picture data in units of groups of picture data comprised of a predetermined plurality of said picture data, generating scheduling result data including decoding order data indicating said determined order and validity data indicating which of the plurality of said picture data is reproduced at a first reproduction rate, selecting said picture data to be processed in said order determined by said decoding scheduling based on said scheduling result data, and, conditional on said selected picture data being valid, making said means for decoding decode, reproduce, and output said picture data and, in response to receiving a reproduction rate change command that changes the first reproduction rate to a second reproduction rate, changing said validity data of said scheduling result data in accordance with the second reproduction rate, wherein when receiving said change command while decoding, reproducing and outputting a first group of picture data at the first reproduction rate, said means for decoding decodes, reproduces, and outputs not yet processed picture data of said first group of picture data based on said changed validity data and the second reproduction rate.

13. A reproduction apparatus as set forth in claim 1, wherein the plurality of picture data is high definition picture data.

14. A data processing system as set forth in claim 9, wherein the plurality of picture data is high definition picture data.

15. A reproduction method as set forth in claim 10, wherein the plurality of picture data is high definition picture data.

16. A computer readable storage medium as set forth in claim 11, wherein the plurality of picture data is high definition picture data.

17. A reproduction apparatus as set forth in claim 12, wherein the plurality of picture data is high definition picture data.

18. A reproduction apparatus as set forth in claim 7, wherein the not yet processed picture data of said first group of picture data is the B picture data, and the B picture data of said first group of picture data is decoded, reproduced and output based on the already decoded and stored I and P picture data in response to said change command, and decoding results of the B picture data are reproduced and output at the second reproduction rate in a decoding time of one picture data.

* * * * *